United States Patent
Zonana et al.

(10) Patent No.: US 9,607,261 B1
(45) Date of Patent: Mar. 28, 2017

(54) COUNTER USING AN INDUCTIVE SENSOR FOR DETERMINING THE QUANTITY OF ARTICLES IN A RECEPTACLE

(71) Applicant: Compliance Meds Technologies LLC, Aventura North Miami Beach, FL (US)

(72) Inventors: Moses Zonana, Hallandale Beach, FL (US); Sergio Bastiani, North Miami Beach, FL (US); Efren Gonzalez, North Miami Beach, FL (US)

(73) Assignee: COMPLIANCE MEDS TECHNOLOGIES LLC, North Miami Beach, FL (US)

( * ) Notice: Subject to any disclaimer, the term of this patent is extended or adjusted under 35 U.S.C. 154(b) by 0 days.

(21) Appl. No.: 14/958,541

(22) Filed: Dec. 3, 2015

Related U.S. Application Data (60) Provisional application No. 62/087,107, filed on Dec. 3, 2014.

(51) Int. Cl.
  *G06M 7/00* (2006.01)
  *G06M 9/00* (2006.01)
  (Continued)

(52) U.S. Cl.
  CPC .............. *G06M 1/274* (2013.01); *G01D 5/20* (2013.01)

(58) Field of Classification Search
  USPC ...................... 377/6–8, 82; 222/36; 206/534
  See application file for complete search history.

(56) References Cited

U.S. PATENT DOCUMENTS 2,851,191 A 9/1958 Semsch
3,601,250 A 8/1971 Merila
(Continued)

FOREIGN PATENT DOCUMENTS

DE  202 16 870  1/2003
EP  1 503 947  2/2005
(Continued)

OTHER PUBLICATIONS

"eCAP . . . the smart cap that enhances medication adherence", Information Mediary Corporation (IMC) and Affiliates, 2011, May 30, 2012, pp. 1-2.
(Continued)

*Primary Examiner* — Adam Houston
(74) *Attorney, Agent, or Firm* — Leason Ellis LLP (57) ABSTRACT

Systems and methods are provided for measuring articles contained within and/or dispensed from a receptacle. The present invention incorporates a counter device that measures the displacement of a conductive target relative to an LC circuit using an inductance-to-digital converter. In operation, a change in weight of articles in a receptacle will displace or deform a conductive target relative to the position of the LC circuit and, as such, it will create a measurable differential relating to inductance. Based on the measured differential, the number of articles (e.g., pills) within and/or taken from the receptacle is determined using a processor. In accordance with a further aspect, the counter is configured to compensate for a temperature-dependent variation in the measured electrical parameter algorithmically using the processor and/or through the particular configuration of the receptacle components.

23 Claims, 8 Drawing Sheets

(51) Int. Cl.
   *G06M 11/00* (2006.01)
   *G06M 1/274* (2006.01)
   *G01D 5/20* (2006.01)

(56) References Cited

U.S. PATENT DOCUMENTS

| | | | |
|---|---|---|---|
| 3,991,908 A | 11/1976 | Thomas et al. | |
| 4,402,426 A * | 9/1983 | Faulkner | G01G 13/2855 177/113 |
| 4,405,045 A | 9/1983 | Villa-Real | |
| 4,611,727 A | 9/1986 | Graff | |
| 4,662,537 A | 5/1987 | Wolf et al. | |
| 4,829,546 A * | 5/1989 | Dueckman | G06M 1/102 340/541 |
| 4,869,392 A | 9/1989 | Moulding, Jr. et al. | |
| 4,939,705 A | 7/1990 | Hamilton et al. | |
| 5,011,032 A | 4/1991 | Rollman | |
| 5,014,798 A | 5/1991 | Glynn | |
| 5,041,721 A * | 8/1991 | Smith | G06M 7/04 377/6 |
| 5,110,008 A | 5/1992 | Moulding et al. | |
| 5,148,944 A | 9/1992 | Kaufman et al. | |
| 5,213,232 A | 5/1993 | Kraft et al. | |
| 5,233,571 A | 8/1993 | Wirtschafter | |
| 5,239,491 A | 8/1993 | Mucciacciaro | |
| 5,313,439 A | 5/1994 | Albeck | |
| 5,347,453 A | 9/1994 | Maestre | |
| 5,472,113 A | 12/1995 | Shaw | |
| 5,583,831 A | 12/1996 | Churchill et al. | |
| 5,609,268 A | 3/1997 | Shaw | |
| 5,623,242 A | 4/1997 | Dawson, Jr. et al. | |
| 5,646,912 A | 7/1997 | Cousin | |
| 5,751,660 A | 5/1998 | Chappell | |
| 5,751,661 A | 5/1998 | Walters | |
| 5,752,620 A | 5/1998 | Pearson | |
| 5,805,051 A | 9/1998 | Herrmann et al. | |
| 5,845,255 A | 12/1998 | Mayaud | |
| 5,884,806 A * | 3/1999 | Boyer | A61J 7/02 221/13 |
| 5,907,493 A * | 5/1999 | Boyer | G06F 19/3462 700/213 |
| 5,915,589 A | 6/1999 | Lim | |
| 5,918,197 A * | 6/1999 | Toussant | G01G 19/415 221/2 |
| 5,953,288 A | 9/1999 | Chappell | |
| 5,971,594 A | 10/1999 | Sahai et al. | |
| 5,995,938 A | 11/1999 | Whaley | |
| 6,018,289 A | 1/2000 | Sekura et al. | |
| 6,138,865 A | 10/2000 | Gilmore | |
| 6,168,563 B1 | 1/2001 | Brown | |
| 6,194,995 B1 | 2/2001 | Gates | |
| 6,201,768 B1 | 3/2001 | de Meyer et al. | |
| 6,220,480 B1 | 4/2001 | Stankus et al. | |
| 6,229,431 B1 | 5/2001 | Weiner | |
| 6,263,259 B1 | 7/2001 | Bartur | |
| 6,294,999 B1 | 9/2001 | Yarin et al. | |
| 6,299,019 B1 | 10/2001 | Leight | |
| 6,324,123 B1 | 11/2001 | Durso | |
| 6,335,907 B1 | 1/2002 | Momich et al. | |
| 6,427,865 B1 | 8/2002 | Stillwell et al. | |
| 6,488,174 B1 | 12/2002 | Cho | |
| 6,507,275 B2 | 1/2003 | Romano et al. | |
| 6,510,962 B1 | 1/2003 | Lim | |
| 6,529,446 B1 | 3/2003 | de la Huerga | |
| 6,545,592 B2 | 4/2003 | Weiner | |
| 6,574,165 B2 | 6/2003 | Sharma et al. | |
| 6,592,005 B1 | 7/2003 | Coughlin et al. | |
| 6,594,549 B2 | 7/2003 | Siegel | |
| 6,604,650 B2 | 8/2003 | Sagar | |
| 6,667,936 B1 | 12/2003 | Ditzig | |
| 6,702,146 B2 | 3/2004 | Varis | |
| 6,707,763 B2 | 3/2004 | Osberg et al. | |
| 6,751,730 B1 | 6/2004 | Walker et al. | |
| 6,988,634 B2 | 1/2006 | Varis | |
| 7,072,738 B2 | 7/2006 | Bonney et al. | |
| 7,073,685 B1 | 7/2006 | Giraud et al. | |
| 7,081,807 B2 | 7/2006 | Lai | |
| 7,097,068 B2 | 8/2006 | Limback et al. | |
| 7,139,639 B2 | 11/2006 | Broussard et al. | |
| 7,147,130 B1 | 12/2006 | Clark et al. | |
| 7,158,011 B2 | 1/2007 | Brue | |
| 7,204,391 B2 | 4/2007 | Toker | |
| 7,213,721 B2 | 5/2007 | Abdulhay et al. | |
| 7,295,889 B2 | 11/2007 | Lahteenmaki | |
| 7,295,890 B2 | 11/2007 | Jean-Pierre | |
| 7,330,101 B2 | 2/2008 | Sekura | |
| 7,359,765 B2 | 4/2008 | Varvarelis et al. | |
| 7,366,675 B1 | 4/2008 | Walker et al. | |
| RE40,453 E | 8/2008 | Lasher et al. | |
| 7,408,843 B2 | 8/2008 | Brandon | |
| 7,418,961 B2 | 9/2008 | Jones et al. | |
| 7,444,203 B2 | 10/2008 | Rosenblum | |
| 7,469,820 B2 | 12/2008 | Rosenblum | |
| 7,471,993 B2 | 12/2008 | Rosenblum | |
| D592,507 S | 5/2009 | Wachman et al. | |
| 7,545,257 B2 | 6/2009 | Brue | |
| 7,554,434 B1 | 6/2009 | Gifford et al. | |
| 7,574,370 B2 | 8/2009 | Mayaud | |
| 7,606,723 B2 | 10/2009 | Mayaud | |
| 7,624,894 B2 | 12/2009 | Gerold et al. | |
| 7,715,277 B2 | 5/2010 | de la Huerga | |
| 7,719,927 B1 | 5/2010 | Robinson et al. | |
| 7,735,681 B2 | 6/2010 | Handfield et al. | |
| 7,739,124 B1 | 6/2010 | Walker et al. | |
| 7,796,472 B2 | 9/2010 | Brandon | |
| 7,801,745 B2 | 9/2010 | Walker et al. | |
| 7,832,591 B2 | 11/2010 | Karwacki, Jr. et al. | |
| 7,844,361 B2 | 11/2010 | Jean-Pierre | |
| 7,860,603 B2 | 12/2010 | Handfield et al. | |
| 7,877,268 B2 | 1/2011 | Kulkarni | |
| 7,878,350 B2 | 2/2011 | Ramoundos | |
| 7,896,192 B2 | 3/2011 | Conley et al. | |
| 7,907,477 B2 | 3/2011 | Puzia | |
| 7,928,835 B1 | 4/2011 | Jovanov et al. | |
| 7,988,016 B2 | 8/2011 | Klein et al. | |
| 8,032,397 B2 | 10/2011 | Lawless | |
| 8,033,424 B2 | 10/2011 | Rosenblum | |
| 8,055,509 B1 | 11/2011 | Walker et al. | |
| 8,056,760 B2 | 11/2011 | Moran, Jr. et al. | |
| 8,060,246 B2 | 11/2011 | Berg | |
| 8,068,931 B2 | 11/2011 | Tran et al. | |
| 8,069,056 B2 | 11/2011 | Walker et al. | |
| D650,986 S | 12/2011 | Brady et al. | |
| 8,091,719 B2 | 1/2012 | Wu | |
| 8,138,939 B2 | 3/2012 | Manning et al. | |
| 8,149,096 B2 | 4/2012 | Metry et al. | |
| 8,152,020 B2 | 4/2012 | Flowers et al. | |
| 8,154,390 B2 | 4/2012 | Heath et al. | |
| 8,165,896 B2 | 4/2012 | Jung et al. | |
| 8,727,180 B2 | 5/2014 | Zonana et al. | |
| 2002/0093429 A1 | 7/2002 | Matsushita et al. | |
| 2002/0104848 A1 | 8/2002 | Burrows et al. | |
| 2004/0124204 A1 | 7/2004 | Giraud | |
| 2006/0071011 A1 | 4/2006 | Varvarelis et al. | |
| 2006/0207996 A1 | 9/2006 | Marteau et al. | |
| 2007/0014191 A1 | 1/2007 | Brandon | |
| 2007/0016443 A1 | 1/2007 | Wachman et al. | |
| 2008/0142533 A1 | 6/2008 | Handfield et al. | |
| 2008/0277307 A1 * | 11/2008 | Mazur | A61J 7/0481 206/534 |
| 2009/0134181 A1 | 5/2009 | Wachman et al. | |
| 2009/0192648 A1 | 7/2009 | Namineni et al. | |
| 2009/0259336 A1 | 10/2009 | Ratnakar | |
| 2010/0006589 A1 | 1/2010 | Klein | |
| 2010/0100237 A1 | 4/2010 | Ratnakar | |
| 2010/0100391 A1 | 4/2010 | Daya et al. | |
| 2010/0270257 A1 | 10/2010 | Wachman et al. | |
| 2010/0305967 A1 | 12/2010 | Daya et al. | |
| 2010/0305975 A1 | 12/2010 | Daya et al. | |
| 2010/0328099 A1 | 12/2010 | Wachman et al. | |
| 2011/0119090 A1 | 5/2011 | Lazar | |
| 2011/0164559 A1 | 7/2011 | Bamidele | |
| 2011/0170655 A1 * | 7/2011 | Yuyama | G07F 11/66 377/6 |

(56) References Cited

U.S. PATENT DOCUMENTS

| | | | |
|---|---|---|---|
| 2011/0284415 A1 | 11/2011 | Balakier et al. | |
| 2011/0317801 A1* | 12/2011 | Nalle, III | G06M 1/06 377/6 |
| 2012/0101630 A1 | 4/2012 | Daya et al. | |
| 2013/0110283 A1* | 5/2013 | Baarman | A61J 7/0084 700/236 |
| 2013/0197693 A1* | 8/2013 | Kamen | G06F 19/3418 700/244 |
| 2013/0200033 A1 | 8/2013 | Zonana et al. | |
| 2013/0304255 A1* | 11/2013 | Ratnakar | G07F 9/02 700/242 |
| 2014/0214199 A1* | 7/2014 | Utech | G06F 17/00 700/236 |
| 2014/0262918 A1* | 9/2014 | Chu | A61J 1/03 206/534 |
| 2015/0027918 A1* | 1/2015 | Chaturvedi | A61J 1/10 206/459.1 |
| 2016/0212389 A1* | 7/2016 | Mehrotra | H04N 7/188 |
| 2016/0239638 A1* | 8/2016 | Bowline | G06Q 50/22 |
| 2016/0314272 A1* | 10/2016 | Braunstein | G06F 19/3456 |

FOREIGN PATENT DOCUMENTS

| | | |
|---|---|---|
| WO | WO 03/001337 | 1/2003 |
| WO | WO 03/097483 | 11/2003 |
| WO | WO 2011/011114 | 1/2011 |

OTHER PUBLICATIONS

Watters, Joanne, "eCAP . . . the smart cap that enhances medication adherence, Key Features", Information Mediary Corporation, p. 1, at least as of Feb. 2, 2012.

"eCAP . . . the smart cap that enhances medication adherence, Technical Specifications", Information Mediary Corporation (IMC) and Affiliates, p. 1, 2011.

"Introducing GlowCaps", Vitality Inc. 2010, May 30, 2012 p. 1 of 1.

"Introducing GlowCaps, How GlowCaps Work", Vitality Inc. 2010, May 30, 2012 p. 1 of 1.

* cited by examiner

FIG. 1

Lateral position sensing

FIG. 2

Resistance of a Typical PCB Coil as a Function of Temperature

FIG. 3A

Multi-Layer Coil Geometry Shift Due to Temperature

FIG. 3B

Inductance of a Coil as a Function of Temperature Across Frequency

Conductive Target Position is Detected with Two Coils

FIG. 5

Slider Position (Triangular Shapes) is Detected with Two Coils

FIG. 6A

Lateral positioning sensing with Z-Axis instability

COUNTER USING AN INDUCTIVE SENSOR FOR DETERMINING THE QUANTITY OF ARTICLES IN A RECEPTACLE

CROSS REFERENCE TO RELATED APPLICATION

This application is based on and claims priority to U.S. Provisional Patent Application 62/087,107, filed Dec. 3, 2014, the entire contents of which is incorporated by reference herein as if expressly set forth in its respective entirety herein.

TECHNICAL FIELD

The present invention relates to counting devices configured to detect the number of objects that are contained within or dispensed from a receptacle and more particularly, to a counting device that uses an inductive sensor to calculate the number of objects that are contained within and/or have been dispensed from the receptacle.

BACKGROUND

There are many settings in which articles (objects) are dispensed from a dispenser in a controlled manner and there is a desire and/or need to keep track of the precise number of articles that have been dispensed and/or the precise number of articles that remain in the dispenser. For example, one such application is a pill dispenser in which pills are initially stored in a pill container and are to be taken according to a schedule. One exemplary pill dispenser is disclosed in U.S. Pat. No. 8,727,180, granted May 20, 2014, which is hereby incorporated by reference in its entirety. The teachings of the present invention can be incorporated into this type of pill dispenser; however, the teachings can equally be incorporated into other types of pill dispensers and can be incorporated into other applications besides pill dispensing (e.g., other applications in which a quantity of articles (objects) are controllably dispensed.

Various systems have been proposed for counting items within or removed from a receptacle using integrated scales and sensors, however, the existing systems each have associated deficiencies. For instance some proposed systems require direct contact between the contained material and electrical sensor elements for measuring the contents. Generally, the proposed systems also lack the ability to measure the contents with sufficient precision and accuracy and fail to adequately account for changes in ambient conditions that can adversely affect the measurements. A further deficiency of the existing systems is that they must be specifically constructed or designed for a particular type of material and are not configured to accurately measure/count a variety of different types of materials having different properties (e.g., weight, size, shape and the like).

It is with respect to these and other considerations that the disclosure made herein is presented.

SUMMARY OF CERTAIN EMBODIMENTS

In accordance with one or more implementations of the present application, disclosed herein is a counter for measuring a quantity of articles and for controlled dispensing of the articles contained within a receptacle. The dispenser comprises a conductive target and an inductive sensor that is configured to measure a displacement of the target relative to the sensor. The displacement is caused by a dispensing event in which one or more of the articles are dispensed from the dispenser. The dispenser further comprises a processor coupled to the inductive sensor to receive an output of the inductive sensor. The processor is configured by executing instructions in the form of code stored in a non-transitory memory to calculate a quantity of the one or more articles dispensed from the dispenser during the dispensing event as a function of the measured displacement and a prescribed weight of an article.

According to a further aspect, the inductive sensor comprises an LC circuit including an inductive coil and a capacitor connected to a digital converter circuit. The digital converter is configured to measure an electrical parameter of the LC circuit relating to inductance and that represents the displacement of the target relative to the inductive coil. The inductive sensor is further configured to output the measured electrical parameter to the processor. In accordance with a further aspect, the dispenser is configured to compensate for a variation in the measured electrical parameter as a function of operating temperature.

It is with respect to these and other considerations that the disclosure made herein is presented.

DETAILED DESCRIPTION OF CERTAIN EMBODIMENTS

As mentioned above, the teachings of the present invention can be incorporated into a number of different receptacles and dispenser type devices and thus can be incorporated in a number of different applications. For illustrative purposes only, the present invention, which includes a counter device for measuring the amount of a material contained within a receptacle and/or dispensed from the receptacle, is discussed below as being incorporated in a pill dispenser used in conjunction with the receptacle; however, this is not limiting of the scope of the present invention since it is merely one exemplary application. It can be appreciated that the counter device and its components can be similarly incorporated into other types receptacles for containing and dispensing various materials of different forms (e.g., solids, liquids, etc.) or dispensing components that can be used with, or integrated into, such receptacles.

The device (e.g., dispenser) of the present invention can incorporate a pill counter that measures the displacement of a conductive element relative to an RF Tuning circuit using an Inductance-to-Digital Converter with sub-micron resolution in position sensing and temperature compensation configuration. In operation as part of a dispenser for dispensing pills from a receptacle, changes in the weight of articles that are in the dispenser will displace or deform a conductive target (e.g., a conductive plate) thereby moving at least a portion of the target relative to the stationary position of at least a portion of the RF Tuning circuit and, as such, it will create a measurable differential value relating to inductance. The measured differential permits the number of articles (pills) taken from the receptacle (e.g., pill container) via the dispenser to be determined using a processor and thus, the number of pills remaining can be similarly determined using the processor. It can also be appreciated that, in accordance with the disclosed embodiments further described herein, the position of the target relative to the RF tuning circuit, which varies as a function of the weight of the articles, similarly can be used to calculate the total amount of the material/articles within the receptacle (e.g., based on the magnitude of the measurable parameter relating to inductance).

Figure 1:
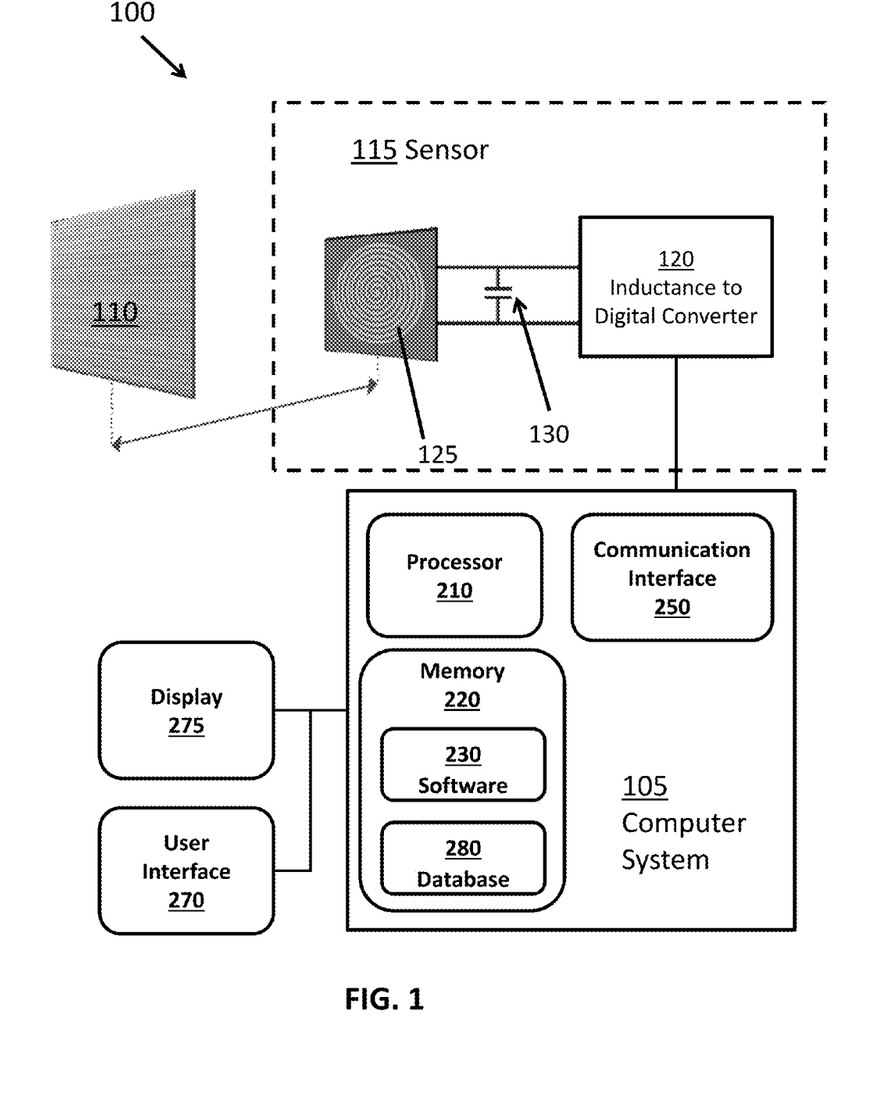
FIG. 1 is a high-level diagram illustrating an exemplary configuration of a counter for counting articles in a receptacle using an inductive sensor in accordance with at least one embodiment disclosed herein.

FIG. 1 is a block diagram illustrating various components of a counter 100 configured to count a number of articles dispensed from (or remaining within) a receptacle in accordance with one or more of the disclosed embodiments. As shown the counter includes a sensor 115 and a target 110 configured to move relative to the sensor 115. As shown, the exemplary sensor includes an LC circuit (also referred to as an RF tuning circuit) that is primarily comprised of at least one inductor coil 125 and capacitor 130 and is coupled to an inductance to digital converter 120. The inductance to digital converter measures an electrical parameter of the LC circuit (e.g., inductance, frequency, Eddy Current Loss) and can convert the measured parameter to a digitized value for output or compute other system parameters based on the measured parameter and output the computed value (e.g., the position or displacement of the target). Although the sensor circuitry is described as including a single inductor 125 and capacitor 130, it can be appreciated that LC circuits can include additional components and have more complex/alternative configurations without departing from the scope of the disclosed embodiments. It will be understood that the sensor 115, is preferably coupled to a computing system 105 including a processor and the like that is in communication with the sensor such that signals (output) from the sensor are delivered as an input to the computing system for processing as further described herein. Although the inductance to digital converter 120 and the computing system 105 are described and depicted as separate processing units, it can be appreciated that the two components can be combined into a single processor or alternatively the respective processing functions can be performed using any number of processors.

FIG. 1 also illustrates the various components of the computing system 105 that is coupled to the sensor 115. As shown, the computing system 105 includes a processor 210 in communication with a computer readable memory 220. Preferably, memory 120 is accessible by processor 110, thereby enabling processor to receive and execute software 230, which includes instructions in the form of executable code stored on memory. Memory can be, for example, a random access memory (RAM) or any other suitable volatile or non-volatile computer readable storage medium. In addition, memory can be fixed or removable and can contain one or more components or devices such as a hard drive, a flash memory, a rewritable optical disk, a rewritable magnetic tape, or some combination of the above. As further described herein, the processor 210 executing the software instructions, is configured to receive the output of the sensor 115, algorithmically process the output and determine the quantity of articles that were dispensed from or remain in the receptacle.

As shown the computing system 105 also can include a communication interface 250 that is operatively connected to the processor 210 so as to output the determined quantity and other related data to one or more external computing devices. Communication interface 250 can be any wired or wireless communication interface that enables communication between the computing system 105, the sensor 115 and external computing devices, as would be understood by those in the art. Communication interface can facilitate short-range and long-range electronic communication between such devices over wired and/or wireless connection mediums and according to various existing communications protocols and protocols that may appear in the future (e.g., Bluetooth™, cellular, WIFI, NFC and the like). As shown the computing system 105 can also include one or more devices such as a display 275 or other output device and user interface 270 operatively connected to the processor 210. The display can include a screen or any other such presentation device which enables a user to view various options, operational parameters, and results generated by the processor 210 (e.g., the calculated quantity of articles), as further described herein. By way of example, display can be a digital display such as a dot matrix display, LED display or other 2-dimensional display. The user interface 270 can be one or more input device(s) such as switch(es), button(s), key(s), a touch screen, etc. that serves to facilitate the capture of certain information from the user in relation to operation of the counter 100 in accordance with the disclosed embodiments. Interface also serves to facilitate the capture of commands from the user such as an on-off commands or settings related to operation of the system.

It should be appreciated that several of the logical operations described herein can be implemented (1) as a sequence of computer implemented acts or program modules running on the various processors that comprise the counter 100 for example and/or (2) as interconnected machine logic circuits or circuit modules within the counter 100. The implementation is a matter of choice dependent on the requirements of the device (e.g., size, energy, consumption, performance, etc.). Accordingly, the logical operations described herein are referred to variously as operations, steps, structural devices, acts, or modules. As referenced herein, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 2:
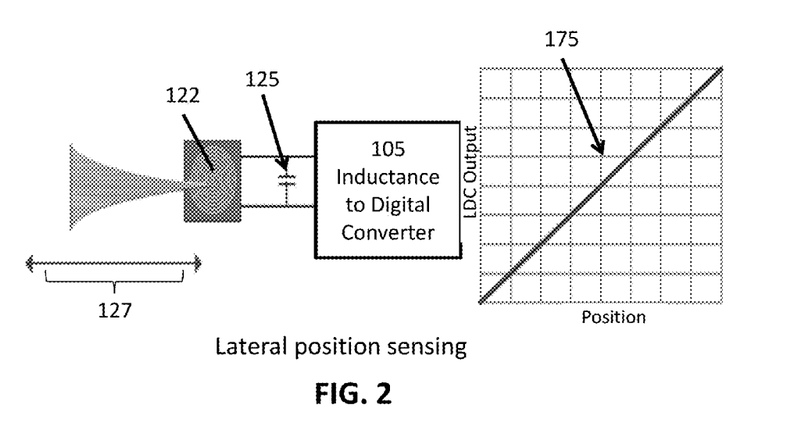
FIG. 2 is a high-level diagram of a sensor in accordance with the embodiment of FIG. 1 and includes a conceptual illustration of a magnitude of a measured electrical parameter and a chart representing a relationship between position and the measured electrical parameter in accordance with at least one embodiment disclosed herein.

The inductive sensor technology (i.e., sensor 115) described herein precisely measures the electrical characteristics of the inductive sensor circuit (i.e., the LC circuit/RF tuning circuit) to detect the presence of a conductive target and its position relative to the inductor coil 125. FIG. 2 depicts the exemplary sensor 115 having a single-inductive coil 125 coupled to the inductance to digital converter 120 and configured to sense the lateral position of the target (not shown). FIG. 2 further provides a conceptual representation of the magnitude 122 of the electrical parameter measured from the LC circuit, which varies as a function of the lateral position of the target relative to the coil as the target moves throughout a range of motion in the lateral direction 127. FIG. 2 also depicts a chart 175 representing the exemplary relationship between the computed positions of the target as a function of the output of the LC circuit, which can be determined using the processor as further described herein.

As further described herein, linearization of the inductance measurement is addressed using differential configuration and, in addition, shifts in the operating temperature of the system (e.g., the sensor 115 and container or cap in which articles (pills) are contained are considered and compensated for algorithmically using the processor 210, and/or by the particular configuration and arrangement of the various sensor components.

In accordance with the disclosed embodiments, inductive sensing is based on measuring the variation of inductance, L, the parallel resistance of the LC circuit (RP) and the Eddy Current Loss or Foucault current on the sensor coil and the surrounding conductors. All of these parameters can be sensitive to temperature on coil design, material, and operating conditions. Temperature-induced effects in RP are mainly due to temperature coefficients of the coil and target materials. Temperature-induced effects in L are a result of the temperature coefficient expansion of the coil structure. These effects are generally much smaller in magnitude. Therefore, measurements based on L are less sensitive to temperature variations.

In one exemplary configuration, the processor 210 of the counter 100 is configured to account for variations in the parallel resistance of the LC Circuit, RP to improve the accuracy of the counting function. In some implementations, the parallel resistance of the LC circuit, RP, is one of the parameters measured by the sensor 115. For instance, RP is calculated based on the following formula:

$$RP=L/(Rs*C),\qquad\text{(Equation 1);}$$

wherein L is inductance, Rs is the equivalent series resistance of the LC circuit and C is the capacitance of the LC circuit.

Figure 3A:
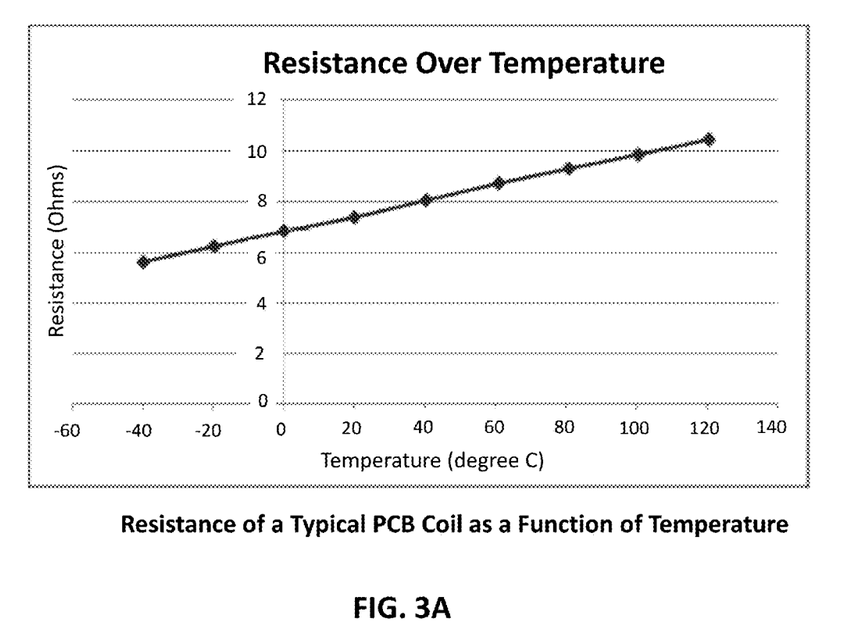
FIG. 3A is a chart representing an exemplary relationship between inductance output by the sensor of FIG. 1 and temperature in accordance with at least one embodiment disclosed herein.

The dominant factor in RP variation is the change of resistivity of the coil and target. Copper, for example, has a resistive temperature coefficient of 0.39%/° C. (3900 ppm/° C.). As would be understood by those in the art, the Temperature Coefficient of Resistance (TCR) is expressed as the change in resistance in ppm (0.0001%) with each degree of change in temperature Celsius (° C.). Many other metals have a similar value. FIG. 3A is a chart depicting an exemplary relationship between resistance of a typical printed circuit board (PCB) coil and temperature.

The value of RP also changes in conjunction with inductance, as described below. This is due to the proportionality of RP to L. More specifically, in the absence of magnetic materials, such as ferrous metals and ferrites which can affect inductance of a coil, the inductance of a coil generally depends only on current flow geometries of the coil. Those currents include the current in the coil itself, as well as all eddy currents induced in surrounding conductors. Further described herein is how temperature variation can affect inductance of air-core coils, for example and without limitation, and how this is accounted for in accordance with the disclosed embodiments. As would be understood by those in the art, air-core coils refers to an inductor that does not depend upon a ferromagnetic material to achieve its specified inductance, for instance, where there air inside the windings as well as windings upon a different insulator such as Bakelite, glass or PTFE and the like.

More specifically, the coil geometry can change with the temperature variation due to thermal expansion or contraction of the coil. For wound copper coils, the coefficient of thermal expansion (CTE) is expressed by the following equation:

$$\alpha=17\times10-6/°\text{ C.(17 ppm/° C.)[Copper],}\qquad\text{(Equation 2)}$$

L is typically proportional to the area of the coil divided by its length. Thus, the overall variation in L is also 17 ppm/° C. For PCB coils there are two cases to consider: a single-layer and multi-layer coil designs. The inductance of a single-layer coil is proportional to its diameter, so a change in L is proportional to CTE of the substrate. For example and without limitation, the majority of PCBs use FR4 for the substrate, which has a CTE of ~15 ppm/° C.

Figure 3B:
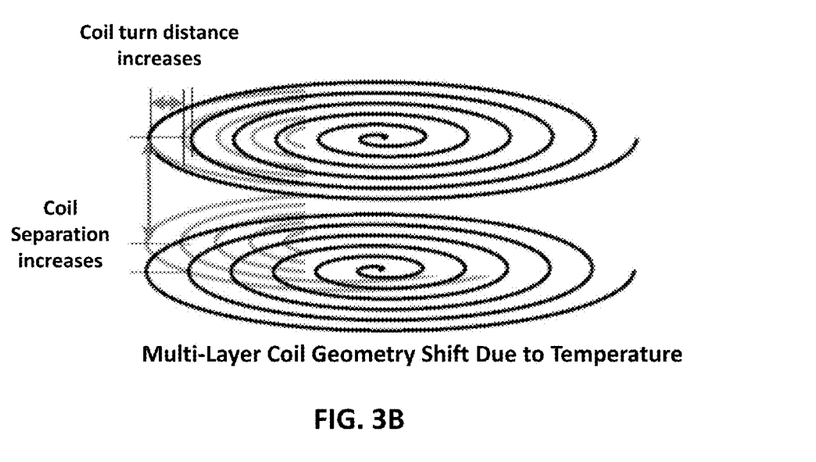
FIG. 3B is a conceptual diagram illustrating an exemplary multi-layer inductive coil and the change in coil geometry as a function of temperature in accordance with at least one embodiment disclosed herein.

In regard to multi-layer coils, changing of the coupling coefficients between different layers, since the change in the PCB width will lead to a change of the coupling between layers, the effective inductance change will actually be smaller than the exemplary 15 ppm/° C. of a single-layer coil. Moreover, in some exemplary configurations, a special coil design can be implemented such that the increase in inductance due to diameter increase can be compensated by decrease in inductance due to thickness increase. For instance, as shown in FIG. 3B, which depicts a multi-layer coil at an original state and also shows the coils in a thermally expanded state, the shift in separation of the coils in a multi-layer coil design is compensated by the change in distance between turns of the coil.

Another effect that can be considered is the change in inductance due to change of the current distribution in the windings (i.e., proximity effect). More specifically, temperature change will change wire resistivity, which in turn will cause a change of the conductive skin depth. This effect, however, is much smaller than expansion-contraction of the PCB and, as such, compensation for this particular effect in inductance is not required for computing a quantity of (articles) removed from or remaining in a receptacle with sufficient precision.

When a target is in proximity of the coil (for instance, target-to-coil distance <50% of the coil diameter distance), temperature effects on the mutual inductance are preferably evaluated.

Figure 3C:
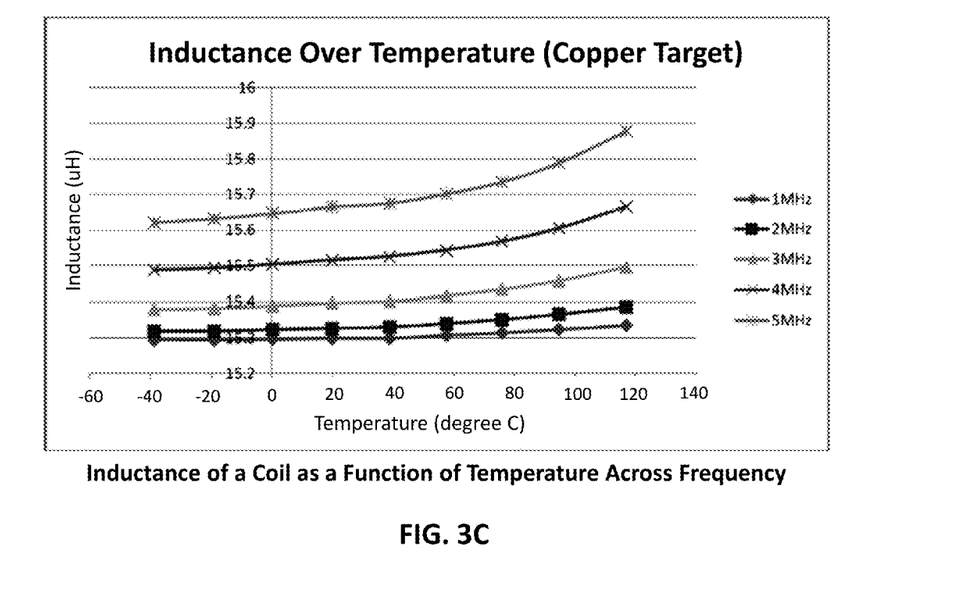
FIG. 3C is a chart representing an exemplary relationship between inductance output by an exemplary sensor as a function of temperature and frequency in accordance with at least one embodiment disclosed herein.

A temperature variation can change resistivity, and consequently eddy current loss distribution in the target. As a result, the change in eddy current loss distribution will impact mutual inductance. The magnitude of the impact depends greatly on the distance to target as well as frequency, and can be on the order of tens of ppm when the target is very close to the coil, quickly dropping to single-digit ppm when the target is at a distance greater than 20% of the coil diameter. By example and without limitation, FIG. 3C is a chart that graphically depicts the exemplary relationship between inductance of an exemplary coil as a function of temperature at various frequencies.

Another (and often more important) consideration relating to the accuracy of the counting function based on inductance is the mechanical configuration of the target that moves relative to the coil. Temperature changes can change the target-coil distance due to expansion-contraction of the mechanical system. Such a change has direct influence on the mutual inductance, especially when the target is very close to the coil.

The exact effect depends on many factors, such as the coil and target separation, geometry, target composition, and so forth. For example, through testing one of the exemplary counters configured to perform the counting function in accordance with the disclosed embodiments, the inventors found that relative change in L (ΔL/L) was equal to relative change in coil-target separation (ΔX/X) divided by 4. As the relative change in X may be large when X is small, care should be taken when designing the mechanical system.

The sensor 115 is configured to measure inductance indirectly by measuring the oscillation frequency of the LC circuit, and inductance is computed using the known capacitance of the LC circuit, which is expressed by the following equations:

$$F=1/(2\pi*\sqrt{(LC)}) \quad \text{(Equation 3)}$$

Thus, $$L=1/(2\pi F)2/C. \quad \text{(Equation 4)}$$

It is important to note that the value of the capacitance is also subject to temperature variations. To minimize this effect, the LC circuit of sensor 115, in particular, capacitor 130, can preferably include COG capacitors, which have a 30 ppm/° C. temperature coefficient.

In regard to inductors with magnetic cores the change in inductance over temperature will be dominated in most cases by change of permeability of the core. Exact calculation of such change can depend on the core material and the shape of the coil.

To meet the performance requirements of the particular application of the counter across a given temperature range (i.e., the whole range of temperatures under which the counter is needed to perform effectively), the exemplary counter 100 preferably utilizes inductance-based measurements, which are measured using the sensor 115, as a basis for performing the counting function. The error due to temperature variation of less than 0.1% is achievable without any temperature compensation under such conditions. However, according to a salient aspect of the subject invention and as further described herein, the counter 100 can be configured to compensate for the variations in RP and L as a function of temperature in accordance with one or more of the exemplary embodiments and concepts described above. In some implementations, the particular measurement basis for performing the counting function can vary depending on the application. For example, in an application in which the object to measure is not magnetic, the sensor can be configured to measure an alternative parameter for instance, RP, eddy current loss (as described above) or inductance, individually or in any combination of the foregoing.

In one or more configurations, the coil and target (e.g., inductive coil 125 and target 110) can be composed of the same material (or materials with similar temperature coefficients of resistivity) and, accordingly, the RP measurements can be corrected by the processor 210 if temperature of the system during operation is known. In addition, the proposed counter 100 can also be configured to assume that the coil and target temperatures are the same.

In some implementations, during the manufacturing process, the counter 100 undergoes an initial system calibration process in which the sensor unit 115 output, as a function of one or more parameters including, without limitation, distance, position and angle of the target relative to the coil, is recorded at a controlled known temperature (25° C., for example). More specifically, during calibration, the sensor unit measures 1/RP of the coil and reports it as a digital value to the processor 210.

Thereafter, the calibration process can include re-calculating calibration data (e.g., a calibration function based on the collected data) to reflect RP as a function of the particular distance.

During system operation, data from the sensor 115 is provided to the processor 210 and then converted to the real RPmeas in Ohms according to the same formula, and then corrected for the temperature according to the following equation:

$$RP=RP\text{meas}/(1+\alpha(T-T\text{cal})) \quad \text{(Equation 5)};$$

wherein RP is the corrected RP value, RPmeas is the measured RP value, α is the temperature coefficient of resistivity, Tcal is the temperature of system calibration, and T is the operation temperature.

Accordingly, the corrected RP value is used by the processor 210 to determine the parameter value from the calibration data obtained during the initial calibration step described above. Using this exemplary compensation method, the temperature variation error can be reduced to less than 0.1%.

Figure 4:
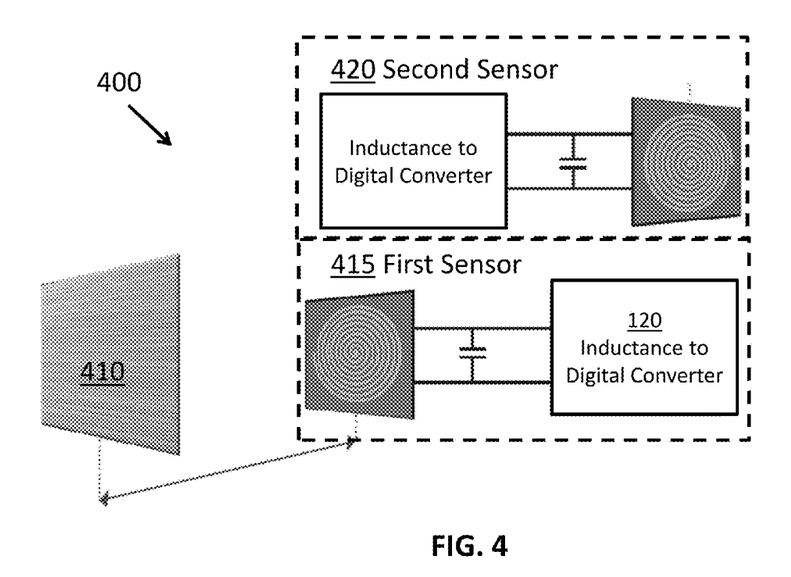
FIG. 4 is a high-level diagram depicting an exemplary configuration of a counter having two inductive sensors in accordance with at least one embodiment disclosed herein.

In another embodiment and optionally, the counter can include a second sensor that can be used as a high-precision temperature compensation system. For instance, FIG. 4 depicts an exemplary counter 400 including a first sensor 415 and a second sensor 420. The second sensor 420 is preferably exposed to the same environment as the main sensor (e.g., first sensor 415), but is arranged such that its output should not be materially influenced by the varying parameter (e.g., the distance/position/angle of the target 410). Accordingly, the output of the second system can be calibrated as a function of the temperature, and can be used to measure temperature during system operation, which can then be used to calculate the corrected RP value as described above.

In one or more implementations, if the temperature coefficients of the coil and the target are significantly different, or a coil with a magnetic core has to be used, or there are some other sources of non-linearity in temperature dependence present in the system, RP will no longer be linear with temperature. To correct for temperature variation in such case, a Look-up Table approach can be used by the processor 210. In particular, in such an implementation, the system performance can be characterized across temperature range during the design and initial calibration process (e.g., as described above) where RP as a function of the parameter (e.g., distance, position, angle, and so forth) of the target relative to the coil is measured and recorded at various temperatures. In addition, as described above, the measured relationships can be used to generate one or more adjustment functions representing RP vs. a particular parameter for respective temperatures and stored by the processor 210 (e.g., in memory 220).

During system operation, the appropriate adjustment function curve of RP vs. parameter is chosen by the processor 210 according to current temperature and used to measure the parameter as a function of RP. In addition, measurement precision can be further improved by the processor by using interpolation of calibration data to temperature values that are not present in the stored data.

Figure 5:
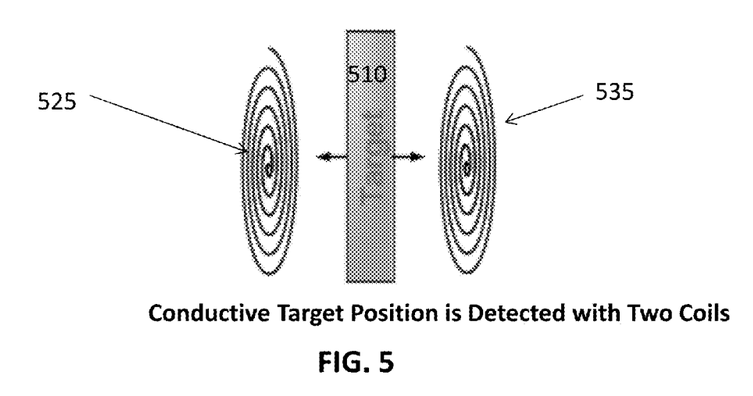
FIG. 5 is a high-level diagram depicting an exemplary counter configuration including two inductive coils and a target in accordance with at least one embodiment disclosed herein.

In one or more embodiments, the counter can be configured to compensate for the temperature variation by including an additional sensor to the system design. As can be appreciated, the additional sensor can include an additional LC circuit having an inductive coil. An exemplary multi-coil sensor configuration is shown in FIG. 5 and includes a first coil 525 and a second coil 535 and, in this particular configuration, a target 510 there-between. Preferably, the coil(s) and target are composed of the same material and are operating at the same temperature.

In such an implementation, the equivalent serial resistance of the system, RS, as a function of temperature can be represented by the following equation:

$$RS(T)=RS0[1+\alpha(T-T0)], \qquad \text{(Equation 6)};$$

wherein RS0 is the system resistance at temperature T0, T is the temperature, and α is the temperature coefficient of resistivity.

Figure 6A:
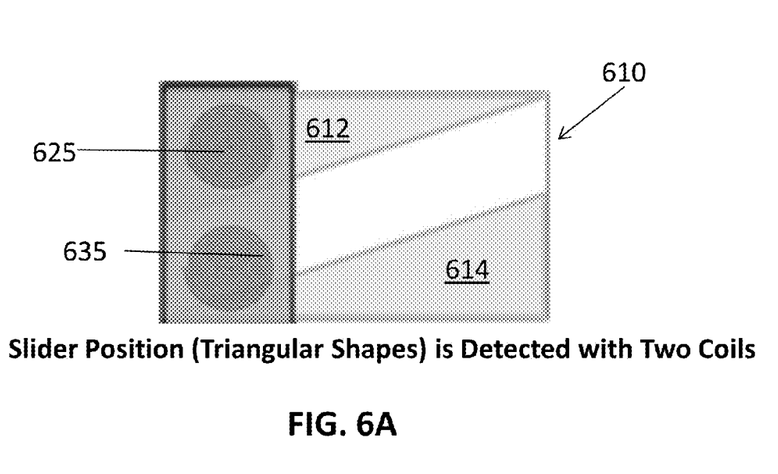
FIG. 6A is a high-level diagram depicting an exemplary counter configuration including two inductive coils and a target in accordance with at least one embodiment disclosed herein.
Figure 6B:
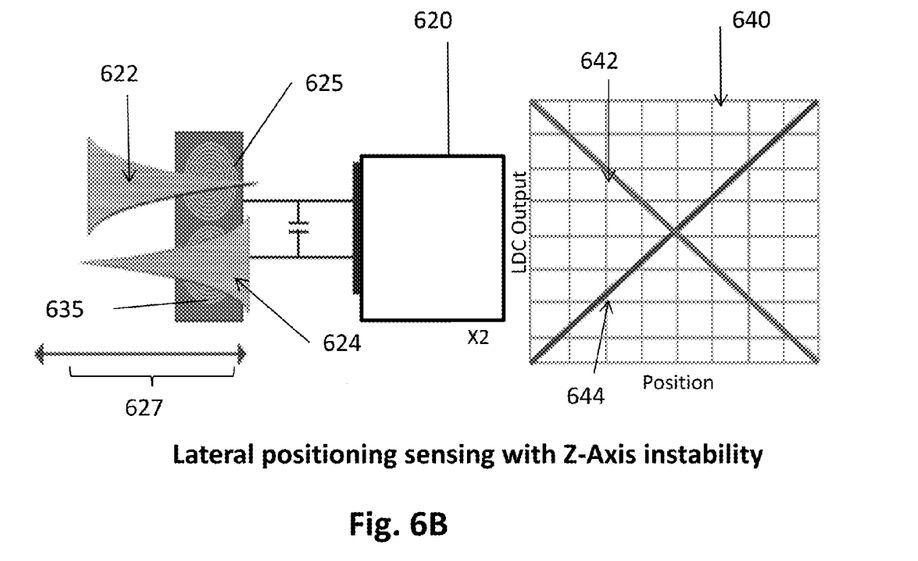
FIG. 6B is a high-level diagram depicting two sensors in accordance with the embodiment of FIG. 6A and includes a conceptual illustration of a magnitude of an electrical parameter measured by the sensors and a chart representing a relationship between a position of a target and the measured electrical parameters.

In the multi-sensor configuration, the coils are arranged such that the outputs of the sensors depend differently on the measured parameter (distance/position/angle of the target). For example, if the position of a target is to be measured, the sensors can be located on opposite sides of the target, as shown in FIG. 5, such that the target moves perpendicular to a surface of the coils (e.g., moves towards one coil and away from the other, and vice versa). By way of further example, the coils can be arranged in the same plane and the target can slide parallel to the plane above the coils between a first position and a second position. For instance, FIG. 6 depicts an exemplary multi-coil arrangement with co-planar coils 625 and 635 and includes at target 610 comprising two "sliders" (e.g., first slider 612 and second slider 614) that are triangular. As shown in FIG. 6, the triangular sliders have the same shape but are preferably pointed to opposing sides (e.g., are arranged in the same plane and a complementary fashion). Accordingly, when the target is at the first position, the first slider 612 is above the first target 625 and the surface area of first slider 612 that is above the first target 625 is large. Conversely, the surface area of the second slider 614 that is above the second target 635 is small. By virtue of the complementary arrangement of the sliders, as the target slides between the first position to the second position, the surface area of the first slider 612 above the first target 625 decreases proportionally to the corresponding increase in surface area of the second target 614 above the second target 635. FIG. 6B depicts the two coils (e.g., 625 and 635) coupled to an inductance to digital converter 620 and also visually depicts the parameter measured from the first coil 622 (which is a function of the overlap between the first slider and first target) and corresponding parameter measured from the second coil 624 throughout the range of motion of the target in the lateral direction 627 above the coils. FIG. 6B also depicts the corresponding chart 640 which provides a graphical representation of the outputs measured from the two-sensor LC circuit as a function of position.

Accordingly, it can be appreciated that the ratio of the measured RP values will be temperature independent, as shown in the following equation:

$$RP1/RP2 \sim RS2(T)/RS1(T)=RS02[1+\alpha(T-T0)]/RS01[1+\alpha(T-T0)]=RS02/RS01 \qquad \text{(Equation 7)};$$

wherein RS01 and RS02 values are temperature independent.

As a result of the foregoing, an error due to temperature variation of less than 0.1% is expected with such a configuration for temperature compensation.

It can be appreciated that the inductive based counting components can be incorporated into the structural design of the receptacle and/or a dispenser portion, which can be a separate unit or integral to the receptacle or omitted, in any number of different manners so long as the counting components operate in the manner described above. For example, when the counter is integrated into a pill receptacle that holds and dispenses pills, the inductive based sensors can be incorporated into and/or disposed along a side wall of the receptacle or along a bottom of the receptacle so long as proper contact results between the pills and the counter.

Figure 7A:
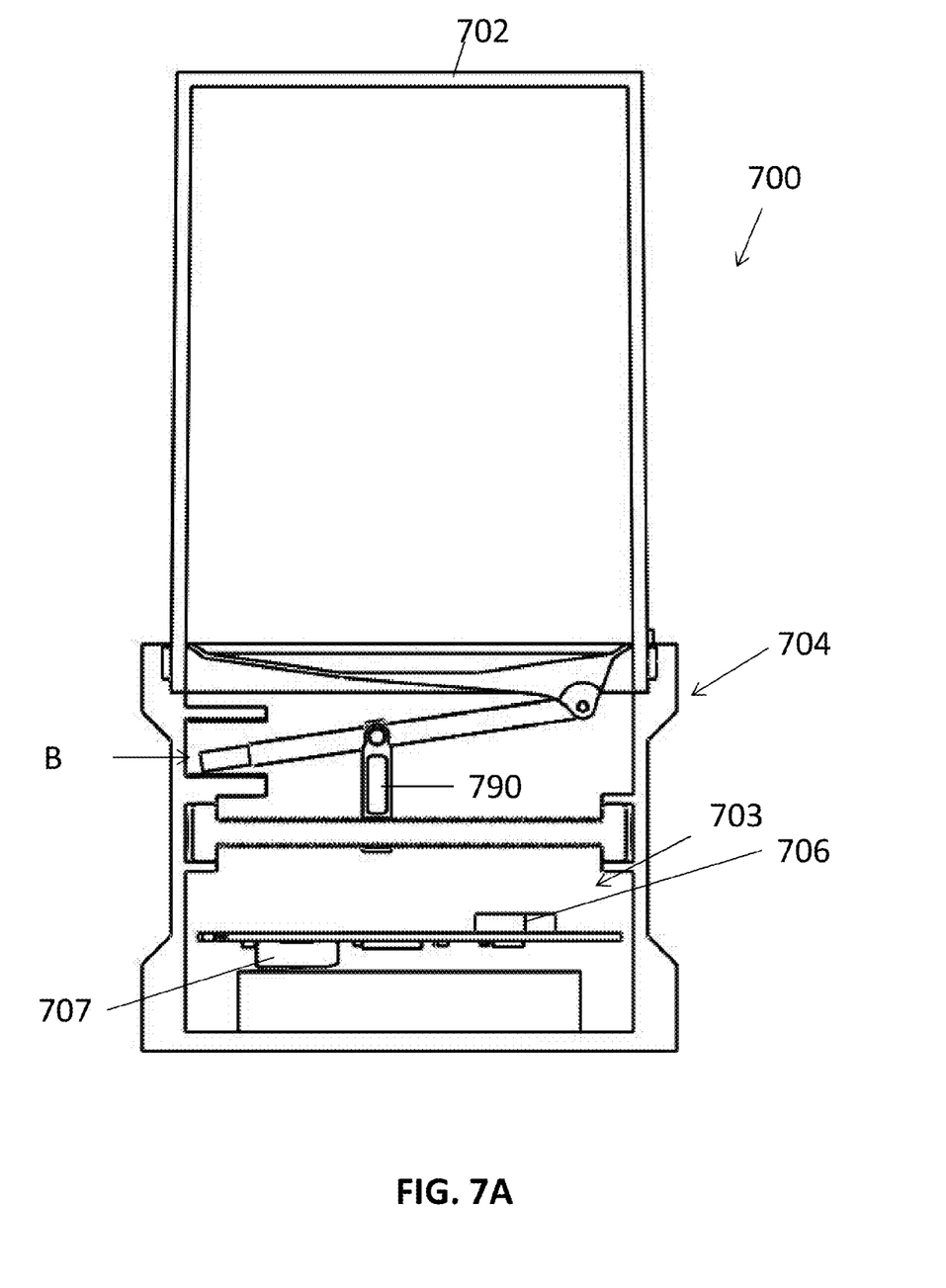
FIG. 7A is a side, cut-away view of an exemplary a pill container including a dispenser and counter in accordance with at least one embodiment disclosed herein.

More specifically, FIG. 7A is a cut-away, side view of an exemplary pill container 700 having a body 702 for holding pills and a dispenser 704 in the form of a cap structure that is mated to the body. As shown, when the pill container is inverted, the dispenser forms the base (e.g., bottom) portion of the container 700. The dispenser 704 includes a counter unit 703 that includes one or more sensors an inductive sensor and a computing device (not shown). In this particular exemplary configuration two inductive sensors 706 and 707 are shown. In alternative variations a single sensor unit can be used. It can be appreciated that the counter 703, using the one or more sensors, is configured to count the number of pills dispensed and/or retained in the pill container in accordance with one or more of the disclosed embodiments described in relation to FIGS. 1-6B.

Figure 7B:
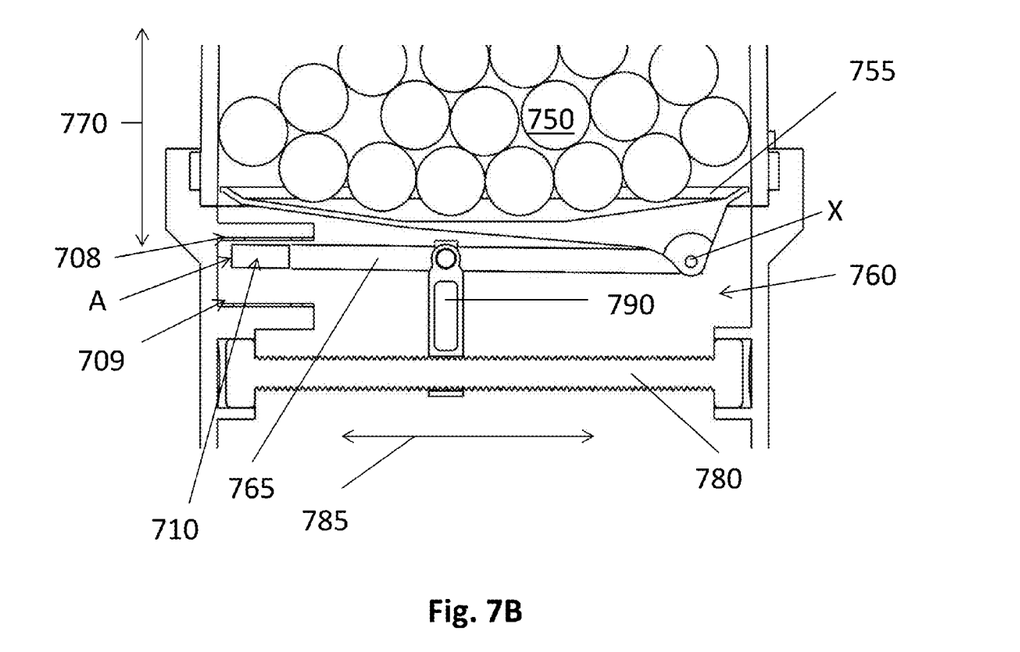
FIG. 7B is a close up of the exemplary pill container of FIG. 7A.

FIG. 7B is close up view of a portion of the inverted pill container of FIG. 7A and showing pills 750 contained within the body and resting against a tray 755 of the dispenser 704. Turing to FIG. 7B, the tray can be configured to move in a vertical direction 770 and is coupled to a mechanical mechanism 760 that controls the amount the tray moves in the vertical direction (i.e., as a function of the weight of the pills resting against the tray) and translates such vertical movement into movement of a target 710. Accordingly, the mechanical mechanism is configured to controllably move the target as a function of the change in weight of the pills resting against the tray. As shown, the movement of the target 710 is substantially in the vertical direction 770 and relative to a first inductive coil 708 and second inductive coil 709 arranged on opposite sides of the target 710.

In the particular example shown in FIG. 7B, the mechanical mechanism 760 is a linkage system pivotably coupled to the tray 755 that includes a lever 765 that moves in the vertical direction 770. As shown, the target 710 is disposed at the end of the lever. A weight adjustment arm 790 is slideably coupled to the lever and a guide rod 780. The weight adjustment arm 790 is configured such that its position along the lever and the guide rod can be changed as a function of the weight of the pills resting against the tray. In other words, weight adjustment arm provides a moving pivot point for the lever that adjusts to the weight in the receptacle such that the corresponding range of motion of the target in the vertical direction 770 when the weight changes (e.g., as the pills are dispensed) is consistent irrespective of the overall weight of the pills against the tray.

This non-varying target displacement facilitates the ability of the dispenser to read a change in weight resulting from a dispensing event using the same device with the same level of accuracy irrespective of the weight of the particular material in the container. As such, the dispenser can be used for various materials/articles/items without requiring dispensers specific to the particular weight of the material.

Accordingly, when a pill is removed from the receptacle, the sensors 706 and 707 (shown in FIG. 7A), which in this particular example are primarily located in the bottom of the dispenser but include, respectively, the first inductive coil 708 and the second inductive coil 709 arranged on opposite sides of the target 710, can measure the change in the position of the target 710 relative to the inductive coils in accordance with the various exemplary embodiments described above. Based on the change in position of the target and the particular mechanical characteristics of the system (e.g., a prescribed relationship between the weight on the tray 755 and the position of the target 710, or a ratio for the change in weight to the change in target position), the processor (not shown) of the counter 703 can calculate the change in weight and the corresponding number of pills taken from the pill container and/or the number of pills remaining in the pill container. It can also be appreciated that the processor can similarly calculate the total weight before and after the change in weight and thus determine the number of pills removed from the pill container based on a prescribed weight of a single pill.

The aspect of the proposed embodiments concerning controlled displacement of the target irrespective of the particular weight of the items in the receptacle are further described herein with continued reference to FIGS. 7A and 7B. The sensor displacement between starting point "A" (when full, as shown in FIG. 7B) and "B" (when empty, as shown in FIG. 7A), is the same regardless of payload. In order to translate this displacement of the target between positions "A" and "B" to different weight payloads, the sliding weight adjustment arm 790 changes the pivot point of the lever 765 and mechanically allows the opposite end of the lever "X" to displace shorter/larger distances depending on the particular sensing resolution required. For instance, by moving the pivot point along the lever, a lighter payload now has mechanical advantage to create the same amount of displacement as a heavier payload would (with a different pivot point). As such, a lighter payload would displace the target the same amount (from "A" to "B") as a heavier payload. Accordingly, the starting position of the lever can be kept consistent and the total displacement distance (from full to empty) should not change based on what weight is being measured. However, the opposite end "X" of the lever, which is connected to the payload within the receptacle, will be different based on where the pivot point is located along the lever.

In addition, as further described herein, based on the set-point, the exemplary dispenser can also be configured to algorithmically distinguish between different payloads, determine the weight of individual payload units/items, determine a total count, and what weight or displacement differential constitutes a single unit dispensing event.

In some implementations, the pivot point can be set by the individual filling the receptacle based on the type of payload (e.g., type of pills or materials) and, the counter can be provided with information concerning what type of payload is in the receptacle. Accordingly, all mathematical weight or count calculations for that particular payload can be carried out programmatically by software based on the set-point. However, it can be appreciated that the pivot point can, in some implementations, automatically adjust based on the initial weight of the payload. In addition, the processor can be provided with the particular type of payload, for instance, by receiving a user-interface input from the pharmacist filling the receptacle. In addition or alternatively, the processor can be provided with the set-point of the weight adjustment arm and can be configured to identify the payload type from the set-point according to an algorithm that logically associates one or more payloads with respective set-points. In some implementations, the counter can be configured to automatically detect the position of the weight adjustment arm using one or more position sensors, for instance, an inductive sensor that measures the siding position of the weight adjustment arm relative to an inductive coil as the arm is moved in the horizontal direction 785. It can be appreciated that alternative position sensing devices can be used to detect the set-point. Essentially, the processor of the counter can be configured to determine where the pivot point is set and, therefore, can adjust the calculation of what one (1) unit is for that particular payload. In addition, based on pre-defined rules/algorithms which are a function of the location of the pivot point (e.g., mechanical advantage), the processor can also calculate the starting weight/count for the items that comprise the payload.

Accordingly, the exemplary dispenser provides the ability to alter the resolution of the measurements by adjusting the pivot point. Accordingly, each device, can measure movement of the target within the position range of starting at point A to endpoint B with an adjustable resolution defined by the measuring system (e.g., 1 unit/article=0.XX measure of weight or corresponding measure of displacement) and for various payload weights. As such, the exemplary embodiment provides high accuracy for a payload weight range that falls within the measurement range and resolution. If the exemplary dispenser is used to measure an object that is smaller than the 0.XX resolution the counter can be configured to round up to the nearest 0.XX so as to provide an accurate reading and, essentially, adding error. By providing a moveable pivot point of the balance/scale and performing the counting function based on the set-point, the exemplary dispenser can essentially vary the resolution that it is able to measure and therefore can accommodate to different size/weight payloads while not requiring a different measurement sensor.

The configuration of the mechanical linkage described in relation to FIGS. 7A-7B is provided as a non-limiting example and it can be appreciated that other dispenser configurations for controllably moving the target 710 as a function of the weight of the pills 750 resting against the tray 755 can be implemented without departing from the scope of the present invention. For instance, the target can alternatively be affixed to the bottom of a tray that is supported by one or more compressible springs such that the target moves in the vertical direction as a function of weight and the vertical position of the target relative to a single sensor can be measured and used to calculate the number of pills dispensed.

It is to be understood that like numerals in the drawings represent like elements through the several figures, and that not all components and/or steps described and illustrated with reference to the figures are required for all embodiments or arrangements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Various modifications and changes can be made to the subject matter described herein without following the example embodiments and applications illustrated and described, and without departing from the true spirit and scope of the present invention, as set forth in each and any of the following claims.

What is claimed is:

1. A counter for measuring a quantity of articles and for controlled dispensing of the articles contained within a receptacle comprising:
    a conductive target;
    an inductive sensor configured to measure a displacement of the target relative to the sensor, wherein the displacement is caused by a dispensing event in which one or more of the articles are dispensed from a dispenser of the receptacle; and
    a processor coupled to the inductive sensor to receive an output of the inductive sensor, wherein the processor is configured by executing instructions in the form of code stored in a non-transitory memory to calculate a quantity of the one or more articles dispensed from the receptacle during the dispensing event as a function of the measured displacement and a prescribed weight of an article.

2. The counter of claim 1, wherein the inductive sensor comprises:
    an LC circuit including an inductive coil, and a proximity magnetic target that change the inductance as a result of change the distance to the coil,
    an inductance to digital converter coupled to the LC circuit that is configured to measure an electrical parameter of the LC circuit that represents the displacement relative to the inductive coil and output the measured electrical parameter to the processor, and wherein the electrical parameter relates to inductance.

3. The counter of claim 2, wherein the target and the coil are arranged within the receptacle such that a change in weight of the articles in the receptacle displaces the conductive plate relative to the at least one inductive coil and causes a differential in a measured electrical parameter, and wherein the quantity is calculated based on the differential.

4. The counter of claim 1, wherein the displacement of the conductive plate is one or more of: movement of the conductive plate and a deformation of the conductive plate.

5. The counter of claim 1, wherein the receptacle comprises a pill container and the articles comprise pills each approximately having the predefined weight.

6. The counter of claim 3, wherein the coil is disposed along a bottom of the receptacle.

7. The counter of claim 1, wherein the inductive sensor is configured to compensate for a variation in the measured electrical parameter as a function of operating temperature.

8. The counter of claim 1, wherein the processor is configured to communicate over a network, and wherein output of the inductive sensor is stored in the memory and is processed by the processor to calculate the quantity.

9. The counter of claim 8, wherein the processor is configured to compare a current signal output from the sensor to a previous signal output from the sensor to determine the change in quantity of articles that was dispensed in a current dispensing event, wherein the current signal and the previous signal represent a current position and a previous position respectively and thus represent the displacement of the target caused by the dispensing event.

10. The counter of claim 1, wherein the sensor includes a plurality of sensing elements that are spaced apart from one another such that the displacement is measured relative to each of the plurality of sensing elements.

11. The counter of claim 2, wherein the sensor is configured to measure the oscillation frequency of the LC circuit and compute inductance using a prescribed capacitance of the LC circuit.

12. The counter of claim 2, wherein the LC circuit includes a COG capacitor to minimize the effect of temperature variations.

13. The counter of claim 2, further comprising:
    a calibration function stored in the memory, wherein the calibration function is defined during an initial calibration of the counter; and
    wherein the processor is configured to convert the measured inductance to the real RP component value, and compute a corrected RP value according to the calibration function.

14. The counter of claim 13, wherein the inductive coil and the target are composed of one or more of: the same material and materials having a similar temperature coefficient of resistivity.

15. The counter of claim 14, wherein the corrected RP value is calculated according to the following formula:

$$RPcorr=RPmeas/(1+\alpha(T-Tcal)),$$

wherein RPcorr is the corrected RP value, RPmeas is the measured RP value, $\alpha$ is a temperature coefficient of resistivity constant, and Tcal is a measured temperature during the initial calibration, and T is the temperature during operation.

16. The counter of claim 13, further comprising:
    a temperature sensor configured to measure a temperature during operation, wherein the calibration function is defined as a function of the measured temperature during calibration.

17. The counter of claim 16, wherein the temperature sensor is an inductive temperature sensor that is arranged within the receptacle such that the temperature sensor is exposed to the same environment as the inductive sensor and is not influenced by the displacement of the target.

18. The counter of claim 13, wherein the inductive coil and the target are composed of materials having a respective temperature coefficient of resistivity that is dissimilar, and wherein the calibration function comprises:
    a plurality of adjustment functions characterizing the relationship between RPmeas and displacement for respective operating temperatures; and wherein the processor is configured to compute a corrected RP value by:

selecting an adjustment function among the plurality of adjustment functions based on the measured temperature during operation, and compute the corrected RP value as a function of the real RP component value and the selected adjustment function.

19. The counter of claim 1, further comprising:

a second inductive sensor having a second LC circuit including a second inductive coil, wherein the inductive coil and the second inductive coil are spaced apart from one another and are configured such that the output of the inductive sensor and the second inductive sensor depend differently on the displacement of the target; and wherein the inductive sensor and the second inductive sensor are configured to output a respective serial resistance value to the processor;

wherein the processor is configured to compute the quantity as a function of a ratio of the respective serial resistance values received from the inductive sensor and the second inductive sensor.

20. The counter of claim 19, wherein the inductive coil and the second inductive coil and the target are composed of one or more of: the same material and materials having a similar temperature coefficient of resistivity.

21. The counter of claim 19, wherein the inductive coil and the second inductive coil are arranged on opposite sides of the target such that the displacement of the target is relative to both the inductive coil and the second inductive coil during the dispensing event.

22. The counter of claim 19, wherein the inductive coil and the second inductive coil are arranged in a first plane and wherein the target is configured to be displaced in a parallel plan to the first plane during the dispensing event.

23. A device for measuring a quantity of a substance contained within a receptacle comprising:

a conductive target;

an inductive sensor configured to measure a position of the target relative to the sensor, wherein the position is a function of the quantity of the substance within the receptacle; and a processor coupled to the inductive sensor to receive an output of the inductive sensor, wherein the processor is configured by executing instructions in the form of code stored in a non-transitory memory to calculate the quantity of the substance as a function of the measured displacement and a prescribed weight of the substance.

* * * * *